Patented June 30, 1953

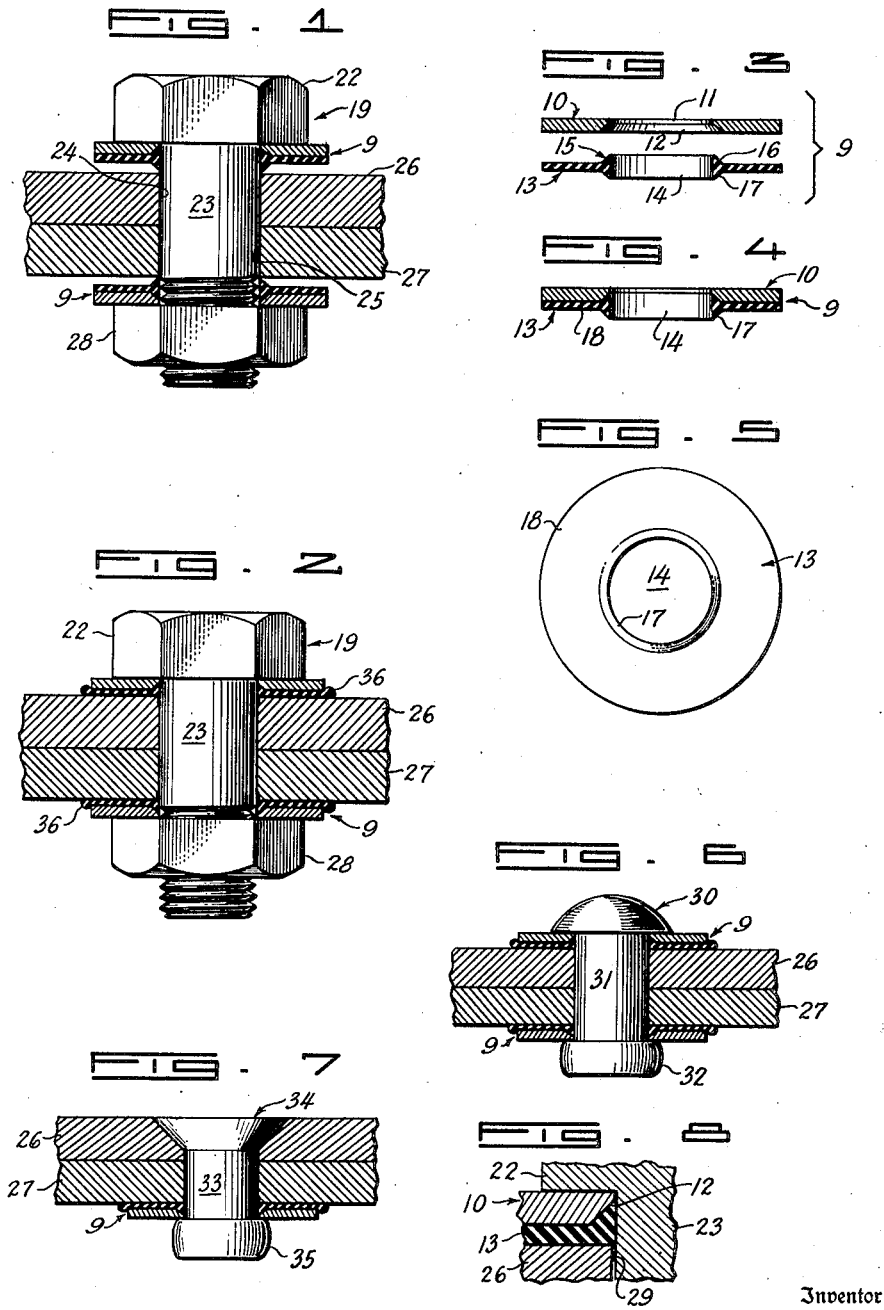

2,643,904

UNITED STATES PATENT OFFICE 2,643,904

SEALING ELEMENT

Oscar Y. Wehmanen, Fort Worth, Tex., assignor to Consolidated Vultee Aircraft Corporation, San Diego, Calif., a corporation of Delaware Application February 14, 1947, Serial No. 728,471

1 Claim. (Cl. 288—20)

This invention relates to improvements in sealing means adapted to be utilized in conjunction with bolts or rivets in the construction of fuel tanks and similar fluid receptacles.

It is common practice in the aircraft industry to construct fuel storage means which are an essential part of the wing structure itself and which are referred to as integral fuel tanks. Naturally, constructions such as this propose many problems, among them being the difficulty of sealing the shanks of rivets or bolts which are utilized in the construction of these integral tanks. Although highest tolerances are specified it is almost inevitable that some of the holes in the structures to be joined will be slightly oversize and thus the leakage of highly volatile fuel about the shanks of the rivets or bolts inserted in these holes must be prevented by the use of an auxiliary sealing means.

In the past attempts have been made to seal the gap between bolt or rivet and the sides of the hole by the use of liquid sealants sprayed in the interior of the tank. Such expedients, while moderately successful, have not been uniformly so and the present invention was developed to provide a positive means for sealing the gap between the shank of the fastener and the sides of the hole in which it has been inserted. Although the invention is described as used in conjunction with integral fuel tanks in aircraft it is conceivable that it would be applicable to uses in many other types of fluid containing or storing vessels and it is not intended that the invention be limited to use in sealing aircraft fuel tanks alone.

It is, therefore, an object of this invention to provide positive means for sealing the gap between the shanks of fasteners utilized in the construction of fluid containing vessels.

Another object of this invention is the provision of fastener sealing means which consists of a backing element of sheet metal having formed thereupon gasket means having an internal bead adapted to seal the gap between the shank of said fastener and the sides of the hole in which said fastener has been inserted.

An additional object of the present invention is the provision of sealing means for the shanks of fastening means which is designed to be forced against that part of the shank of said fastening means which lies within the hole in which it has been inserted.

Other objects and advantages of the present invention will be made apparent upon reading the specification and consulting the accompanying drawing in which:

Figure 1 is a vertical sectional view showing sealing means constructed in accordance with the present invention mounted on fastening means prior to the tightening up of said fastening means;

Figure 2 is a vertical sectional view showing the deformation of the gasket portion of the sealing means about the shank of the fastening means caused by the compressive forces executed upon said sealing means when said fastening means is tightened up;

Figure 3 is a vertical sectional view of the two elements comprising the sealing means before they are joined together;

Figure 4 is a vertical sectional view showing the two elements of the sealing means joined together;

Figure 5 is a bottom plan view of the gasket portion of the sealing element showing the raised annular wedge-shaped portion of resilient material which is an integral part of said gasket portion;

Figure 6 is a vertical sectional view showing the use of the sealing element in conjunction with a round head rivet;

Figure 7 is a vertical sectional view showing the use of the sealing element in conjunction with a flush rivet; and Figure 8 is a detailed, sectional view which shows the manner in which the sealing element seals the shank of the fastening element with which it is utilized.

There is shown in the drawings (Figure 4) a preferred embodiment 9 of the subject invention. The sealing element consists, in this case, of a metallic backing element consisting in a circular, steel washer 10, which has formed in the center thereof a hole 11. The greater portion of the walls of the hole 11 is chamfered at an angle of 45° to provide a bevel 12 at the lower portion of the walls of the hole 11.

Adapted to be vulcanized or otherwise affixed to washer 10 is a circular gasket or resilient element 13 which has formed therein a hole 14 which is concentric with the hole 11 in washer 10 when the washer and resilient element are joined together. The hole 14 in sealing element or gasket 13 is surrounded by an internal, triangular-shaped bead or lip 15. The upper wedge-shaped portion 16 of triangular-shaped bead 15 is adapted to seat in the bevel 12 cut in the side walls of hole 11 in backing element 10. The lower wedge-shaped portion 17 of triangular-shaped bead 15 depends below the underside 18 of resilient gasket 13.

When a bolt 19 (Figure 1) having a head 22 and a shank 23 is inserted in holes 24 and 25 in sheets of metal 26 and 27, respectively, to form a lap joint between said sheets one sealing element 9 is placed beneath the head 22 of the bolt 19 with the underside 18 of the gasket 13 and the lower wedge-shaped portion 17 of triangular-shaped bead 15 facing downward and adapted to contact the upper side of sheet 26. Another sealing element 9 is inserted on the lower portion of shank 23 and is supported thereon by means of a nut 28 which is threadedly engaged with the shank 23 of bolt 19. In this case the underside 18 of gasket 13 is turned upwardly with the lower portion 17 of triangular-shaped bead 15 facing the underside of sheet 27.

When the nut 28 is tightened upon the threads of shank 23, sealing elements 9 are drawn into contact with the upper surface of sheet 26 and the lower surface of sheet 27. Should there be a gap between the shank 23 of bolt 19 and the side walls of holes 24 in sheet 26 and 25 in sheet 27 the compressive force exerted upon the gasket 13 by the tightening of said bolt will cause the wedge-shaped portion 17 of triangular bead 15 to flow into the gap between said shank and said side walls, causing the formation (Figure 8) of a downwardly or upwardly projecting annular sleeve 29 out of wedge-shaped portion 17 of triangular bead 15 and preventing the leakage of fuel about the shank 23 of bolt 19.

There is shown in Figure 6 the utilization of sealing elements 9 in conjunction with a round head rivet 30, of conventional type, which has had formed on the lower portion of shank 31 thereof an upset or "made" head 32, the formation of which has exerted compressive force upon sealing elements 9 to cause the gasket bead 15 to seal off the shank 31 should the holes in which it has been inserted prove to be oversize and capable of permitting the leakage of fuel past said shank.

In Figure 7 the application of the sealing element 9 to the problem of sealing the shank 33 of a flush head rivet 34 is shown. Because of the shape of the rivet only one sealing element can be used and that is juxtaposed to the underside of sheet 27 by the formation of upset head 35 on the lower portion of shank 33. The formation of head 35 exerts sufficient compressive force to cause the sealing action of bead 15 of gasket 13 to take place and to seal off shank 33 from the possible leakage of fluid or fuel.

In addition to sealing off the shank of fasteners with which it is associated, sealing element 9, through the medium of the body portion of gasket 13, acts as a seal against the surface of the sheets against which it is compressed, thus providing a double seal which is further augmented by an auxiliary bead 36 formed on the periphery of gasket 13, when the fastener with which the sealing element is associated is tightened down.

There is thus disclosed a sealing element which, in addition to sealing the surface about the hole in which a fastener is inserted, also seals the shank of the fastener in that portion of the hole which is oversize and past which fluid or fuel may flow.

It is, of course, obvious that the embodiment disclosed in the specification and shown in the drawings has been utilized to illustrate the manner of construction and mode of operation of the device and it should be readily apparent that changes may be made in the construction which will, nevertheless, fall within the scope of the claim appended hereto.

I claim:

A composite sealing element for a bolt having a head portion and a shank portion, comprising a backing element having an opening passing centrally therethrough, with the wall defining said opening having a bevel formed therein, a gasket member comprising a body portion formed of resilient material coextensive in area to said backing element, and which body portion is bonded to one face of said backing element, said body portion having a circular opening therein of constant diameter throughout its height aligned with the opening in said backing element, and an integral bead formed on said body portion about the periphery of the opening therethrough and extending into the bevel in said backing element.

OSCAR Y. WEHMANEN.

References Cited in the file of this patent

UNITED STATES PATENTS

| Number | Name | Date |
|---|---|---|
| 326,345 | Taylor | Sept. 15, 1885 |
| 1,208,620 | Moser | Dec. 12, 1916 |
| 1,356,404 | Robinson | Oct. 19, 1920 |
| 1,841,051 | Podel | Jan. 12, 1932 |
| 2,014,451 | Pfeifer, Jr. | Sept. 17, 1935 |
| 2,097,713 | Ashley | Nov. 2, 1937 |
| 2,123,035 | Ashley | July 5, 1938 |
| 2,287,135 | Robertson | June 23, 1942 |
| 2,310,405 | Dodge | Feb. 9, 1943 |
| 2,353,988 | Batesole et al. | July 18, 1944 |
| 2,367,697 | Stitz et al. | Jan. 23, 1945 |
| 2,419,385 | Beier | Apr. 22, 1947 |